US009944195B2

(12) United States Patent
Stimm et al.

(10) Patent No.: US 9,944,195 B2
(45) Date of Patent: Apr. 17, 2018

(54) METHOD FOR OPERATING A BATTERY SYSTEM

(71) Applicants: Robert Bosch GmbH, Stuttgart (DE); Samsung SDI Co., Ltd., Yongin-si, Gyeonggi-do (KR)

(72) Inventors: Frank Stimm, Leonberg (DE); Michael Steil, Korntal-Muenchingen (DE); Alfons Doerr, Stuttgart (DE); Andreas Bosch, Oberriexingen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 54 days.

(21) Appl. No.: 14/910,014

(22) PCT Filed: Aug. 1, 2014

(86) PCT No.: PCT/EP2014/066568
§ 371 (c)(1),
(2) Date: Feb. 4, 2016

(87) PCT Pub. No.: WO2015/018747
PCT Pub. Date: Feb. 12, 2015

(65) Prior Publication Data

US 2016/0167541 A1 Jun. 16, 2016

(30) Foreign Application Priority Data

Aug. 5, 2013 (DE) ........................ 10 2013 215 319

(51) Int. Cl.
*B60L 11/18* (2006.01)
*B60L 3/00* (2006.01)
(Continued)

(52) U.S. Cl.
CPC ........... *B60L 11/1861* (2013.01); *B60L 1/003* (2013.01); *B60L 3/0046* (2013.01); *B60L 3/12* (2013.01);
(Continued)

(58) Field of Classification Search
CPC ... B60L 11/1861; B60L 15/2045; B60L 11/18
(Continued)

(56) References Cited

U.S. PATENT DOCUMENTS

2002/0063001 A1 5/2002 Lennevi
2003/0088343 A1 5/2003 Ochiai et al.
(Continued)

FOREIGN PATENT DOCUMENTS

CN 103038091 A 4/2013
DE 101 39 050 A1 2/2003
(Continued)

OTHER PUBLICATIONS

International Search Report corresponding to PCT Application No. PCT/EP2013/066568, dated Mar. 27, 2015 (German and English language document) (7 pages).

*Primary Examiner* — Thomas G Black
*Assistant Examiner* — Wae L Louie
(74) *Attorney, Agent, or Firm* — Maginot, Moore & Beck LLP

(57) ABSTRACT

The disclosure relates to a vehicle architecture for controlling and regulating an electric drive of an electric or hybrid vehicle, having a power electronics system which is connected firstly to the electric drive and secondly to a battery or to a battery system. A battery management system is associated with the battery or the battery system. The vehicle architecture comprises a master controller or a controller which is equipped with a master functionality into which functionalities at least of the battery management system
(Continued)

and of the power electronics system of the electric drive are exported.

8 Claims, 1 Drawing Sheet

(51) Int. Cl.

| | |
|---|---|
| ***G01C 21/34*** | (2006.01) |
| ***B60L 1/00*** | (2006.01) |
| ***B60L 3/12*** | (2006.01) |
| ***B60L 15/20*** | (2006.01) |
| ***B60W 20/13*** | (2016.01) |

(52) U.S. Cl.

CPC ....... *B60L 11/1851* (2013.01); *B60L 11/1874* (2013.01); *B60L 15/20* (2013.01); *B60L 15/2045* (2013.01); *B60W 20/13* (2016.01); *G01C 21/3469* (2013.01); *B60L 2240/423* (2013.01); *B60L 2240/545* (2013.01); *B60L 2240/547* (2013.01); *B60L 2240/549* (2013.01); *B60W 2550/402* (2013.01); *B60W 2710/083* (2013.01); *B60W 2710/244* (2013.01); *B60W 2710/246* (2013.01); *B60W 2710/248* (2013.01); *Y02T 10/645* (2013.01); *Y02T 10/7005* (2013.01); *Y02T 10/705* (2013.01); *Y02T 10/72* (2013.01); *Y02T 10/7275* (2013.01); *Y02T 90/161* (2013.01); *Y10S 903/907* (2013.01)

(58) Field of Classification Search

USPC ............................ 701/22; 180/65.265, 65.29

See application file for complete search history.

(56) References Cited

U.S. PATENT DOCUMENTS

| | | | |
|---|---|---|---|
| 2003/0169001 | A1 | 9/2003 | Murakami et al. |
| 2004/0044448 | A1 | 3/2004 | Ramaswamy et al. |
| 2007/0176731 | A1 * | 8/2007 | Asai ........................ H04L 12/12 340/3.1 |
| 2010/0305794 | A1 | 12/2010 | Foster |
| 2012/0207620 | A1 * | 8/2012 | Dalum ..................... B60K 6/12 417/44.1 |
| 2012/0222438 | A1 | 9/2012 | Osaka et al. |
| 2012/0271758 | A1 * | 10/2012 | Jammer .............. B60L 11/1816 705/39 |
| 2013/0096762 | A1 * | 4/2013 | Houchin-Miller .. B60L 11/1864 701/22 |
| 2016/0167541 | A1 * | 6/2016 | Stimm .................. B60L 3/0046 701/22 |

FOREIGN PATENT DOCUMENTS

| | | | |
|---|---|---|---|
| DE | 10 2005 023 365 | A1 | 11/2006 |
| DE | 10 2008 023 305 | A1 | 11/2009 |
| DE | 10 2012 211 414 | A1 | 1/2013 |
| DE | 10 2011 085 347 | A1 | 5/2013 |
| FR | 2 953 953 | A1 | 6/2011 |

* cited by examiner

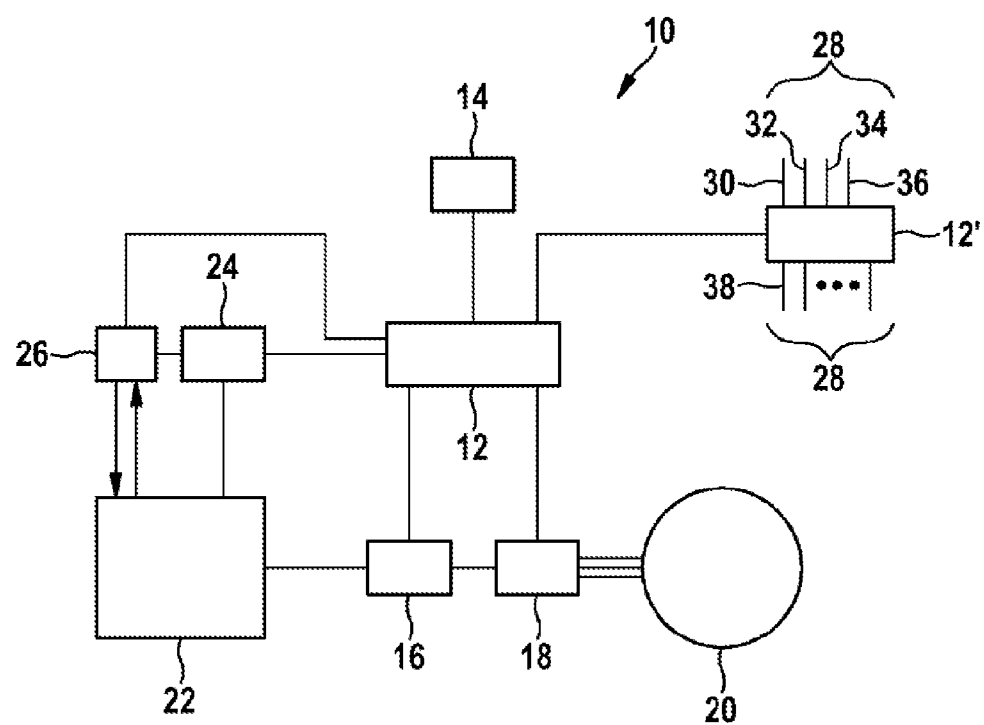
10
28
32
34
30
36
14
12'
24
38
28
26
12
22
16
18
20

METHOD FOR OPERATING A BATTERY SYSTEM

This application is a 35 U.S.C. § 371 National Stage Application of PCT/EP2014/066568, filed on Aug. 1, 2014, which claims the benefit of priority to Serial No. DE 10 2013 215 319.8, filed on Aug. 5, 2013 in Germany, the disclosures of which are incorporated herein by reference in their entirety.

BACKGROUND

DE 101 39 050 A1 relates to a method and an apparatus for carrying out an automatic state of charge equalization. In this case, data relating to the driving habits of the vehicle owner are statistically acquired. After detecting the need for a state of charge equalization, these data are used to provide an optimum time for initiating a preparation phase for the state of charge equalization and the subsequent performance phase.

DE 10 2005 023 365 A1 relates to battery management for batteries in hybrid vehicles. A battery variable such as T, SOC, SOH is determined using a mathematical battery model which describes the thermal and/or electrical behavior of a battery. The battery can be used in a particularly effective manner when the future electrical load $I_{Bat}(t)$ of the battery (4) is estimated and the battery model calculates the future development of the battery variable Z, SOC, SOH on the basis of the estimated electrical load $I_{Bat}(t)$.

The battery of an electrically operated vehicle, a hybrid vehicle or an electric vehicle comprises an arrangement and electrical connection of secondary cells, for example lithium ion battery cells. The battery also usually comprises a control or regulation device which is used to measure the battery cell voltages, the battery cell temperatures and the total current and to use these measurement variables in a model-based manner to predict the maximum electrical powers or currents which may be requested by an electrical drive from the battery in the next time steps. The result is directly transmitted to the drive, for example, via a data bus system, for example a CAN bus.

The electrical drive of a vehicle, more precisely the power electronics, is likewise informed of a desired torque to be set by the vehicle via such a bus system, the origin of which torque is in the gas pedal position and therefore with the driver, for example. The power electronics attempt to provide this desired torque by connecting a B6 semiconductor bridge. The B6 semiconductor bridge is able to apply its input voltage in modulated form to the phases of the electrical machines and to generate a torque by means of the resulting current. The power electronics are intended to comply with the power/current prediction for the battery at any time in order to avoid stressing the battery beyond the permitted degree.

Since the battery and the drive are a physically connected unit, it is entirely possible for the power electronics to request higher powers or currents from the battery than is beneficial to the battery. In this case, the battery has only the theoretical last possibility of opening its main contactors. If the battery does not do this, which will also be impossible in most driving situations for reasons of safety, the following is the effect on the battery, depending on overloading:

More strongly progressive ageing of the battery cells may result. More severe heating of the battery cells can also be feared and, following therefrom, possibly the contravention of safety-critical temperature levels. Finally, voltage limits for the battery cell which are stored in software are contravened.

The extreme situation which would also affect the power electronics would be a low-impedance short circuit applied to the battery via the bridge circuit in the power electronics.

SUMMARY

The disclosure proposes a vehicle architecture for controlling and regulating an electrical drive of an electric or hybrid vehicle, having power electronics which are connected to the electrical drive, on the one hand, and to a battery or a battery system, on the other hand, a battery management system being assigned to the latter. The vehicle architecture proposed according to the disclosure is distinguished by the fact that it comprises a master control device, to which functionalities of at least the battery management system and of the power electronics of the electrical drive are transferred. The additional master control device of the vehicle architecture proposed according to the disclosure provides a superordinate management option which can be used to carry out comprehensive tasks, for example the optimization of various parameters, for example the necessary cooling of the battery or battery system or matching to different states of charge or driving states of the vehicle. As a result of the master control device proposed according to the disclosure, a control and/or regulating entity is provided or a software functionality is implemented on an already existing control device and can be used to access all relevant subsystems, for example a cooling system of the vehicle, for example the cooling system for the battery or the battery system, the power electronics for the electrical drive or else the battery management system of the battery or the battery system.

In addition to the battery or the battery system, the vehicle architecture therefore comprises a battery disconnect unit, which is part of the battery system and may be fitted inside or outside the battery, and also the power electronics which are assigned to the electrical machine, that is to say of the electrical drive. The battery or the battery system is in turn monitored by a battery management system which receives measuring device information relating to voltages and temperatures and currents in the battery and, inter alia, also controls a cooling system assigned to the battery or the battery system.

The master control device proposed according to the disclosure may be connected to a navigation system of the vehicle inside the vehicle architecture and may also be connected to the already mentioned cooling system, the power electronics of the electrical drive and a battery disconnect unit.

The method of operation of the central control and/or regulating entity used according to the disclosure is now that the latter can ensure, by means of suitable algorithms and by resorting to the use of information from the navigation system of the vehicle relating to the route to be traveled in each case, that the vehicle can be handled in an optimum manner. As a result of the master control device proposed according to the disclosure, it is therefore possible to directly control the cooling system of the battery or the battery system, which may become necessary in the hot season in the case of high outside temperatures, for example. Furthermore, a functionality of the power electronics can be transferred to the master control device to the effect that the master control device also makes it possible to reduce the torque requirement of the vehicle and therefore the vehicle power by acting on precisely those power electronics. This allows the operability of the vehicle to be improved, for example with regard to the range, and allows only particular vehicle powers and vehicle speeds and torques which do not have any negative effects on continuous further operation of the vehicle battery or the battery system.

It is also possible to implement adaptive control systems or regulating algorithms in the master control device proposed according to the disclosure, which control systems or regulating algorithms optimally match the overall system "vehicle" to the driver's driving style and to the expected driving situations. It is optionally possible to optimize the range for the expected route by resorting to the data provided by the navigation system of the vehicle. As a result of the master control device which is used according to the disclosure and constitutes a superordinate control entity, it is possible to control or regulate additional vehicle components, for example an electrical air-conditioning system compressor, an AC/DC converter for charging with alternating current (on-board charging device), HV heating devices (HV PTCs), coordination of a DC quick-charging interface (DC quick-charging post, charging station) and DC/DC converters which can be used to support the 12 V vehicle electrical system, via precisely that master control device.

The solution proposed according to the disclosure can be advantageously used to provide a superordinate management entity which solves comprehensive problems of partially contradictory parameters, for example torque requirement and charging capacity of the battery or the battery system and associated conflicts in the event of conflicting requests. For this purpose, the master control device comprises suitable algorithms and can ensure that a route to be traveled is optimized, for example by possibly resorting to the information provided by the vehicle navigation system. The practice of transferring functionalities from the control devices, for example the main control device of the battery management system and the power electronics of the electrical drive and possibly a further vehicle component, to the master control device provides technical and economic advantages. This is because each system per se no longer needs to be in the form of a closed system with respect to the outside world; the overall system is closed by the master control device. The striking advantage of the vehicle architecture proposed according to the disclosure can be seen in the fact that a number of independent control devices now no longer communicate with one another and the efficiency of the vehicle now no longer depends on how well this communication functions on buses, for example CAN data buses. Rather, the solution proposed according to the disclosure provides a vehicle architecture having a superordinate control and/or regulating entity which coordinates and ultimately also determines the operating strategy by globally coordinating and matching the operating parameters.

The solution proposed according to the disclosure is particularly efficient with respect to the calculation complexity and the period required for these calculations. The solution proposed according to the disclosure avoids a plurality of systems having to communicate with one another and each subsystem per se then having to carry out regulation and control. The overall system proposed according to the disclosure can be more robust with respect to consequences of software errors and can be checked more easily than individual subsystems. In the case of the individual subsystems, it would be theoretically necessary to simulate all conditions which could occur during communication or interaction between the respective subsystems in order to achieve complete test coverage. Since time is saved on account of calculation periods being reduced since matching sequences between two control devices, for example, have now become superfluous, the master control device can be regulated and controlled more quickly. In the case of safety-relevant functions in particular, this results in the safety being increased and can therefore contribute significantly to protecting people, material and the environment.

BRIEF DESCRIPTION OF THE DRAWING

The disclosure is described in more detail below using the drawing.

The single FIGURE schematically shows the components of the vehicle architecture proposed according to the disclosure.

DETAILED DESCRIPTION

Individual components of a vehicle architecture proposed according to the disclosure can be gathered from the illustration according to FIG. 1 in a schematic representation.

A vehicle architecture 10 comprises an additional control element 12 which is referred to as the master control device below. The master control device 12 is connected to a navigation system 14 of the vehicle which is integrated in the vehicle architecture 10.

The vehicle architecture 10 also comprises a battery disconnect unit (BDU), compare item 16. A battery disconnect unit 16 comprises main contactors which are used to connect or disconnect the battery 22 or the battery system 22 from the high-voltage port network.

The battery disconnect unit 16 may also comprise precharging contactors with precharging resistors connected in series in order to make it possible to gently precharge intermediate circuit capacitances in the vehicle. A battery disconnect unit 16 may optionally also have quick-charging contactors which are again connected in series with the main contactors in order to be able to separately disconnect DC charging interfaces. One example are, for example, lines to a socket which is concealed behind a conventional gas cap. A vehicle charging post could be inserted there. The line which runs to this interface inside the vehicle can again be separately connected to the quick-charging contactor. A battery disconnect unit 16 may also comprise a current sensor system in order to be able to measure the battery current based on shunt and/or Hall measurement technology. In addition, battery disconnect units 16 may also comprise fuses or pyrotechnically effective separating elements which, in the case of a short circuit that occurs at very high currents, can separate the battery pack from the high-voltage vehicle electrical system if, for example, the separability of the main contactors has been exceeded at this current level (short circuit). In addition, voltage measurements can be carried out at different points in the battery disconnect unit 16 for the respective battery pack voltages, and contactor and fuse diagnoses can be carried out. In addition, temperature sensors, humidity sensors, pressure sensors and gas sensors may be provided in a battery disconnect unit 16 in order to be able to evaluate further information from the battery pack. Busbars or electric cables run from the individual battery cells of the battery 22 or of the battery system 22 to the battery disconnect unit 16. The interfaces to the vehicle are usually situated at the latter. Vehicle cable harnesses are inserted there and the battery is therefore connected to the vehicle electrical system. It is possible to install the battery disconnect unit 16 inside the battery pack of the battery 22 or to arrange it in the vicinity of the battery pack. It is not absolutely necessary for the battery disconnect unit to have a closed housing; rather, it is possible to place the components cursorily mentioned above inside the battery pack.

The master control device 12 is also connected to power electronics 18 of at least one electrical drive 20, that is to say the drive of a hybrid or electric vehicle.

There is also a direct connection between the master control device 12 and a cooling system 26 which is directly assigned to a battery or a battery system 22. The master control device 12 is also to a battery management system 24 which is used to monitor the battery 22 or the battery system 22 with respect to the battery voltages, temperatures and the flowing currents.

The additional control element comprises an expansion part 12' comprising a number of additional connections 28. The number of additional connections 28 makes it possible to optionally connect additional vehicle components, for example an electrical air-conditioning system compressor 30 and an AC/DC converter 32, as an on-board charging device. The additional connections 28 also include at least one connection for a heating device 34 (HV PTCs, positive temperature coefficient). It is also possible to connect a DC quick-charging interface 38 (DC quick-charging post, charging station) to the expansion part 12' of the master control device 12 within the scope of the additional connections 28; a DC/DC converter 38 for the 12 V network could also be connected within the scope of the additional connections 28.

In previous applications, only just this is carried out by the battery management system 24, which is assigned to the battery 22 or to the battery system 22, in a manner isolated to possible damage or the ageing of the battery cells installed in the battery 22 or the battery system 22. The power electronics 18 assigned to the electrical drive 20 are likewise managed only in isolation with respect to possible damage and optimized conditions in the power electronics. Although the power electronics 18 and the battery management system 24 communicate with one another, there is a lack of a superordinate control entity which resolves conflicting requests. The master control device 12 which is proposed according to the disclosure and is integrated in the vehicle architecture 10 provides a control entity which has access to all relevant subsystems, in particular to the cooling system 26, the battery management system 24 and the power electronics 18 of the at least one electrical drive 20. The method of operation of the vehicle architecture 10 proposed according to the disclosure is reflected in the fact that the master control device 12 ensures, by means of suitable algorithms and also by optimally using the information from the vehicle navigation system 14 with respect to the route to be negotiated, that the electric or hybrid vehicle is operated in an optimum manner.

This is reflected, for example, in the fact that it is possible to act immediately, that is to say directly, on the cooling system 26, which is assigned to the battery 22 or the battery system 22, via the master control device 12, 12' in the case of high outside temperatures, for example. It is also possible to act on the power electronics 18 used to regulate the electrical drive 20 via the central control entity, that is to say the master control device 12, by reducing the torque requirement of the vehicle and i.e. therefore the vehicle power. Adaptive control/regulating systems are also implemented in the master control device 12, 12' and match the overall electric vehicle or hybrid vehicle system in an optimum manner to the driver's driving style and to the expected driving situations. Information transmitted to the master control device 12 via the navigation system 14 can therefore be used to optimize the range of the electric or hybrid vehicle since information relating to the expected route is immediately available.

The practice of transferring functionalities from the battery management system 24, the power electronics 18 and possibly other components, compare additional connections 28, to a master control device 12, 12' provides technical and economic advantages since each system per se no longer has to be in the form of a closed system. As a result of the solution proposed according to the disclosure, only a number of independent control devices now no longer communicate with one another, which results in the efficiency of the vehicle no longer depending on how well the communication takes place on a vehicle data bus but rather on the fact that a superordinate control entity in the form of a master control device 12, 12' or a software functionality representing said master control device on a control device coordinates and ultimately determines the operating strategy of the electric or hybrid vehicle by globally coordinating and matching the operating parameters.

The invention claimed is:

1. A vehicle architecture for controlling and regulating an electrical drive of at least one of an electric vehicle and a hybrid vehicle, the vehicle architecture comprising:

power electronics connected to the electrical drive and to a battery system, the power electronics being configured to drive the electrical drive and control a torque of the electrical drive;

a battery management system that is assigned to the battery system, the battery management system configured to monitor the battery system and control a cooling system of the battery system; and a master control device connected to the power electronics, the battery management system, and a navigation system, the master control device being configured to:

receive information from the navigation system;

operate the battery management system to control the cooling system based on the received information; and operate the power electronics to reduce the torque of the electrical drive based on the received information.

2. The vehicle architecture as claimed in claim 1, wherein the master control device is configure operate the battery management system to control the cooling system in response to an outside temperature.

3. The vehicle architecture as claimed in claim 1, wherein the master control device is configured to operate the power electronics to reduce the torque of the electrical drive based on an expected route of the at least one of the electric vehicle and the hybrid vehicle.

4. The vehicle architecture as claimed in claim 1, wherein the master control device is configured to optimize a range for an expected route using the information from the navigation system by operating the battery management system to control the cooling system and operating the power electronics to reduce the torque of the electrical drive.

5. The vehicle architecture as claimed in claim 1, wherein the master control device configured to control at least one of the following vehicle components via additional connections:

an electrical air-conditioning system compressor;

an AC/DC converter;

at least one heating device;

a DC quick-charging interface; and a DC/DC converter for a vehicle electrical system.

6. A method for controlling and regulating an electrical drive of at least one of an electric vehicle and a hybrid vehicle, the method comprising:

a) receiving information from a navigation system with a master control device of a vehicle architecture;

b) operating, with the master control device, a battery management system of the vehicle architecture to control a cooling system of a battery system based on the received information; and c) operate, with the master control device, power electronics of the vehicle architecture to reduce a torque of the electrical drive based on the received information.

7. The method as claimed in claim 6, further comprising:

optimizing operation of the at least one of the electric vehicle and the hybrid vehicle using the information from the navigation system.

8. The method as claimed in claim 6, wherein the operating of the battery management system to control the cooling system and the operating of the power electronics of the vehicle architecture to reduce the torque of the electrical drive are performed based on at least one of a driver's driving style and an expected driving situation.

* * * * *